US010226983B2

(12) United States Patent
Ludwig et al.

(10) Patent No.: US 10,226,983 B2
(45) Date of Patent: Mar. 12, 2019

(54) MOTOR VEHICLE

(71) Applicant: Mahle Behr GmbH & Co. KG, Stuttgart (DE)

(72) Inventors: Lars Ludwig, Altbach (DE); Dirk Neumeister, Stuttgart (DE); Roland Burk, Stuttgart (DE)

(73) Assignee: Mahle Behr GmbH & Co. KG (DE)

( * ) Notice: Subject to any disclaimer, the term of this patent is extended or adjusted under 35 U.S.C. 154(b) by 263 days.

(21) Appl. No.: 14/667,310

(22) Filed: Mar. 24, 2015

(65) Prior Publication Data
US 2015/0273979 A1 Oct. 1, 2015

(30) Foreign Application Priority Data

Mar. 25, 2014 (DE) .................. 10 2014 205 532

(51) Int. Cl.
*F25B 25/02* (2006.01)
*F25B 27/02* (2006.01)
(Continued)

(52) U.S. Cl.
CPC ....... *B60H 1/3201* (2013.01); *B60H 1/00885* (2013.01); *B60H 1/323* (2013.01); *B60H 1/3204* (2013.01)

(58) Field of Classification Search
CPC .... F25B 25/02; F25B 27/02; F25B 2400/141; B60H 1/00885; B60H 1/3201; B60H 1/02;
(Continued)

(56) References Cited

U.S. PATENT DOCUMENTS

2005/0188711 A1* 9/2005 Wang ................. B60H 1/00878
62/238.6
2006/0112706 A1* 6/2006 Inoue .................. B60H 1/3201
62/238.3
(Continued)

FOREIGN PATENT DOCUMENTS

DE 2101995 A1 7/1972
DE 102004053436 A1 5/2006
(Continued)

OTHER PUBLICATIONS

"Machine Translation of DE10 2010056414, Boettcher, 2012".*
(Continued)

*Primary Examiner* — Frantz Jules
*Assistant Examiner* — Martha Tadesse
(74) *Attorney, Agent, or Firm* — Fishman Stewart PLLC

(57) ABSTRACT

A motor vehicle may include an internal combustion engine and an air-conditioning system, which may include a heat exchanger and a compression refrigeration system. The heat exchanger and the compression refrigeration system may be incorporated into a coolant circuit configured to communicate a coolant flow and may have a pump. The compression refrigeration machine may be driven at least one of directly and indirectly via the internal combustion engine. An adsorption system may be incorporated into the coolant circuit and may be connected to the internal combustion engine in a heat-transferring manner. The adsorption system may be configured to receive a waste heat load from the internal combustion engine for operation. A valve device may be incorporated into the coolant circuit and be switchable between at least two position for distributing the coolant flow between the adsorption system and the compression refrigeration system.

19 Claims, 1 Drawing Sheet

(51) Int. Cl.
*B60H 1/02* (2006.01)
*B60H 1/32* (2006.01)
*B60H 1/00* (2006.01)

(58) Field of Classification Search
CPC .......... B60H 2001/3288; B60H 1/3204; B60H 1/323; Y02E 20/14
See application file for complete search history.

(56) References Cited

U.S. PATENT DOCUMENTS

| | | | | |
|---|---|---|---|---|
| 2008/0066473 | A1* | 3/2008 | Henning | B60H 1/3201 62/101 |
| 2012/0125029 | A1* | 5/2012 | Moreau | F24D 3/18 62/235.1 |

FOREIGN PATENT DOCUMENTS

| | | |
|---|---|---|
| DE | 202009000498 U1 | 4/2009 |
| DE | 102010002018 A1 | 8/2011 |
| DE | 102010056414 A1 | 6/2012 |
| JP | 2000-046437 A | 2/2000 |
| WO | WO-2011/142352 A1 | 11/2011 |

OTHER PUBLICATIONS

English abstract of DE 10 2010 056414 A1, Jun. 2012.
European Search Report for EP15157152.8, dated Mar. 3, 2016.
English abstract for JP-2000-46437, Feb. 2000.
English abstract for DE-102010002018, Aug. 2011.
German Search Report for DE-102014205532.6, dated Nov. 11, 2014.

* cited by examiner

MOTOR VEHICLE

CROSS-REFERENCE TO RELATED APPLICATIONS

This application claims priority to German Patent Application No. 10 2014 205 532.6, filed Mar. 25, 2014, the contents of which are hereby incorporated by reference in their entirety.

TECHNICAL FIELD

The present invention relates to a motor vehicle having an internal combustion engine and an air-conditioning system. The invention also relates to a method for air-conditioning such a motor vehicle.

BACKGROUND

In order to control the temperature of a vehicle interior of a motor vehicle or of another component, for example an electrical energy store, waste engine heat is used for heating and a refrigerant circuit is used for cooling. The refrigerant circuit has a compression refrigeration machine having a compressor, which is generally driven either directly and mechanically by an internal combustion engine (generally a diesel or petrol engine) or indirectly, for example by means of an electric motor. Independently of the driving method, however, only the mechanical energy component of the internal combustion engine supplies the compressor of the compression refrigeration machine with drive energy. Depending on the efficiency of the internal combustion engine, around two thirds of the energy contained in the fuel are discharged unused in the form of heat. This means that the energy consumption for air-conditioning the motor vehicle depending on the efficiency is firstly expensive and secondly associated with additional environmental pollution, for example by means of increased $CO_2$ emissions. $CO_2$ emissions are in particular a ubiquitous theme for discussion at present.

DE 10 2004 053 436 A1 discloses an adsorption heat pump for air-conditioning a motor vehicle, having a first adsorber chamber, which is connected via a first connection element to a condenser and via a second connection element to an evaporator. The adsorption heat pump also has a second adsorption chamber, which is connected via a third connection element to the condenser and via a fourth connection element to the evaporator, the evaporator and the condenser being arranged between the first adsorber chamber and the second adsorber chamber and being connected to a pressure-reducing connection element by means of a condensate recirculation line. The adsorber chambers, the condenser and the evaporator are surrounded by a vacuum shell, which is not unsupported. This is intended to provide an adsorption heat pump that has a compact design.

DE 10 2010 002 018 A1 discloses a heating system for an electrically driven motor vehicle, comprising an electrical drive component, an electrical energy store, a coolant circuit with a circulating coolant for absorbing waste heat from the drive component, and a first heat exchanger for exchanging heat between the coolant circuit and the ambient air. A thermoelectric heat pump member is coupled via a second heat exchanger to the coolant circuit in order to transport heat between the coolant circuit and a passenger region, a further thermoelectric heat pump member being coupled to the first heat exchanger in order to transport heat between the coolant circuit and the ambient air. This is intended to create a heating system for an electrically driven motor vehicle that allows the most economical operation possible.

SUMMARY

The present invention is concerned with the problem of specifying an improved or at least an alternative embodiment for a motor vehicle of the generic type, which in particular allows air-conditioning of the motor vehicle with considerably reduced $CO_2$ emissions.

This problem is solved according to the invention by the subject matter of the independent claims. Advantageous embodiments form the subject matter of the dependent claims.

The present invention is based on the general concept of using an adsorption system that is driven by waste heat from an internal combustion engine for air-conditioning a motor vehicle additionally or alternatively to a mechanically driven compression refrigeration machine, as used previously. The adsorption system uses adsorption processes to utilise the waste engine heat, which is already present and has been produced by the energy requirement for propulsion of the motor vehicle. This offers the great advantage that the main component of the necessary air-conditioning energy does not have to be generated additionally, but can be recovered from previously unused waste engine heat. To this end, the motor vehicle according to the invention has the above-mentioned internal combustion engine and an air-conditioning system, which comprises a heat exchanger and a compression refrigeration machine. Both are incorporated in a coolant circuit having a pump, the compression refrigeration machine being driven by the internal combustion engine. The adsorption system that is likewise incorporated in the coolant circuit uses the waste heat of the internal combustion engine for operation and is therefore connected in a heat-transferring manner to the latter. A valve device is also provided, which in one position directs the coolant flow only via the adsorption system and blocks the coolant flow through the compression refrigeration machine. In said valve position, cooling of the coolant and thus also air-conditioning of the motor vehicle, for example of a component of the same or of a vehicle interior, only take place via the adsorption system, the energy for operating said adsorption system being obtained from the previously unused waste engine heat of the internal combustion engine. The use of the previously unused waste engine heat by means of the adsorption system means that the compression refrigeration machine can be relieved of load or, in the most favourable case, even switched off completely. No additional fuel is required to operate the adsorption system, since the drive energy thereof is provided exclusively by the waste engine heat of the internal combustion engine. It is thus possible with the concept according to the invention to reduce the fuel consumption massively, as a result of which fuel costs and exhaust emissions, in particular the $CO_2$ emissions under discussion, can be considerably reduced.

The heat exchanger is expediently configured as a coolant-air heat exchanger. In the coolant circuit a coolant flows, for example a glycol-water mixture, which outputs its cooling effect to the air that is likewise conducted through the heat exchanger and thereby cools the vehicle interior or the component to be cooled. The structural component or component to be cooled can be for example an electrical energy store, in particular a vehicle battery.

In contrast to the coolant circuit, which constitutes a secondary circuit, the compression refrigeration machine contains a refrigerant circuit that constitutes a primary circuit in comparison therewith and comprises a condenser and a compressor. The compressor is mechanically driven directly or indirectly by the internal combustion engine in a known manner. A direct mechanical drive can take place for example by a mechanical coupling, whereas an indirect mechanical drive is effected for example by means of an electric motor, which obtains its electrical energy from the alternator of the motor vehicle, which is in turn driven by the internal combustion engine.

In a further advantageous embodiment of the solution according to the invention, the valve device allows a distribution of the coolant flow as desired between the adsorption system and the compression refrigeration machine. The valve device can thus direct for example 100% of the coolant flow through the adsorption system or compression refrigeration machine or else any desired ratio in between. When the coolant flow flowing through the compression refrigeration machine is completely shut off, the desired cooling energy is produced exclusively by means of the adsorption system and thus exclusively from the previously unused waste engine heat of the internal combustion engine, so in this case the fuel consumption previously required for cooling and therefore also the $CO_2$ emissions can be considerably reduced. A prerequisite is of course that the internal combustion engine provides the necessary heat for operating the adsorption system.

The present invention is further based on the general concept of providing a method for air-conditioning a motor vehicle, which takes place by cooling a vehicle interior or a component by means of a heat exchanger that is incorporated in a coolant circuit. The cooling of the coolant takes place by means of a compression refrigeration machine that is driven by an internal combustion engine and/or by means of an adsorption system that is connected in a heat-transferring manner to the internal combustion engine. Depending on the temperature of the internal combustion engine and thus depending on the thermal energy emitted by the same, it is thus possible to relieve the load of the compression refrigeration machine previously used for cooling or to switch it off completely and, in the most favourable case, to be able to provide the necessary cooling energy exclusively by means of the adsorption system. A distribution of the coolant flow between the adsorption system and the compression refrigeration machine takes place by means of a valve device according to the invention, which can distribute the coolant flow to the compression refrigeration machine and/or to the adsorption system in any desired manner. Therefore, during a cold start of the internal combustion engine, the cooling is provided for example by the compression refrigeration machine, which is mechanically driven directly or indirectly by the internal combustion engine. If the internal combustion engine has a predefined temperature, the adsorption system can be switched on in order to relieve the load of the compression refrigeration machine or even switch it off, said adsorption system using the previously unused heat emitted by the internal combustion engine as an energy source. Overall, the method according to the invention thus allows extremely energy-saving and low-emission air-conditioning of the motor vehicle.

Further important features and advantages of the invention can be found in the sub-claims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
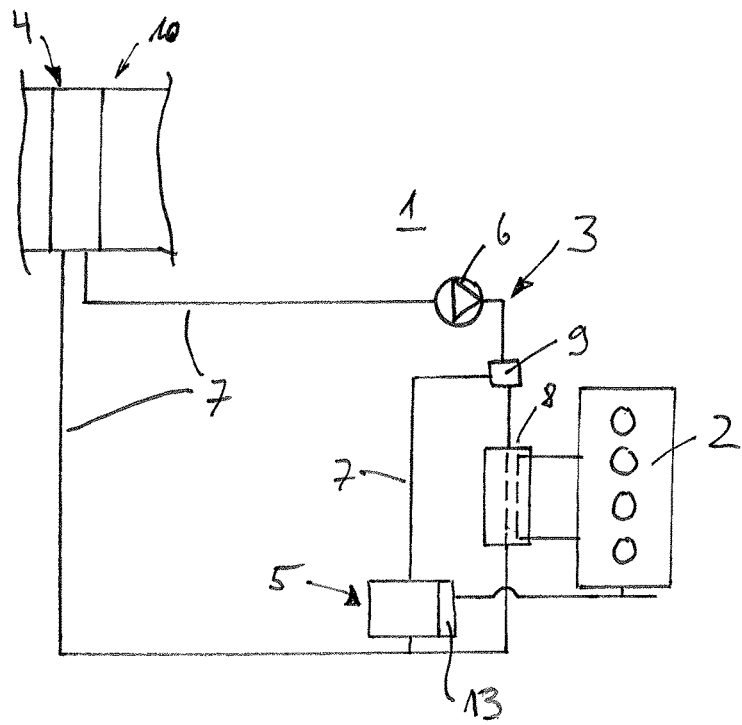
FIG. 1 schematically shows a diagram of a detail of a motor vehicle according to the invention in the region of an air-conditioning system, FIG. 2 schematically shows the air-conditioning system in the region of a heat exchanger.

According to FIG. 1, a motor vehicle 1 according to the invention has an internal combustion engine 2 and an air-conditioning system 3. The air-conditioning system 3 has a heat exchanger 4 and a compression refrigeration machine 5, which are both incorporated in a coolant circuit 7 having a pump 6. The compression refrigeration machine 5 is driven directly or indirectly by the internal combustion engine 2. A direct drive can take place for example by means of a corresponding mechanical connecting member, whereas an indirect drive takes place for example by means of an electric motor, which is supplied with electrical energy by an alternator, said alternator being driven in turn by the internal combustion engine 2. According to the invention, an adsorption system 8 is provided, which is likewise incorporated in the coolant circuit 7 and is connected to the internal combustion engine 2 in a heat-transferring manner for operation and uses the previously unused waste engine heat thereof. Furthermore, a valve device 9 is provided, which in one position directs the coolant flow exclusively via the adsorption system 8 and at the same time shuts off the compression refrigeration machine 5. In another position of course the valve device 9 can direct the coolant flow exclusively via the compression refrigeration machine 5 and thereby shut off the adsorption system 8, whereas of course any desired intermediate positions are also conceivable, in which a portion of the coolant flow flows through the compression refrigeration machine 5, while another portion flows through the adsorption system 8.

The compression refrigeration machine 5 usually has a refrigerant circuit, in the course of which a compressor 13 and a condenser are arranged. The compressor 13 is driven directly or indirectly by the internal combustion engine 2.

The valve device 9 according to the invention and the adsorption system 8 according to the invention, which is likewise integrated into the coolant circuit 7, make it possible for the previously unused engine heat emitted by the internal combustion engine 2 to be used for cooling a structural component, in particular a vehicle interior of the motor vehicle 1. Consequently, if the internal combustion engine 2 has its operating temperature, the cooling energy required for cooling can preferably be generated exclusively by the adsorption system 8, as a result of which the mechanical energy that was previously necessary in addition to the operation of the compression refrigeration machine 5 and had to be provided by the internal combustion engine 2 no longer has to be consumed. The use of the waste engine heat by means of the adsorption system 8 means that the compression refrigeration machine 5 can thus either be relieved of load or even switched off completely; no additional fuel has to be consumed for the operation of the adsorption system 8, but instead just the engine heat, which is available anyway, of the internal combustion engine 2 can be used. This completely novel concept makes it possible for the first time for both fuel costs and exhaust emissions, in particular $CO_2$ emissions, to be considerably reduced.

A coolant, for example a glycol-water mixture, is provided in the coolant circuit 7, said coolant running separately from the refrigerant in the compression refrigeration machine 5. The valve device 9 allows any desired distribution of the coolant flow between the adsorption system 8 and the compression refrigeration machine 5, so for example the compression refrigeration machine 5 can be used exclusively for cooling the motor vehicle 1 during a cold start phase, whereas with increasing heating of the internal combustion engine 2, the waste engine heat thereof can be used for cooling by means of the adsorption system 8.

Figure 2:
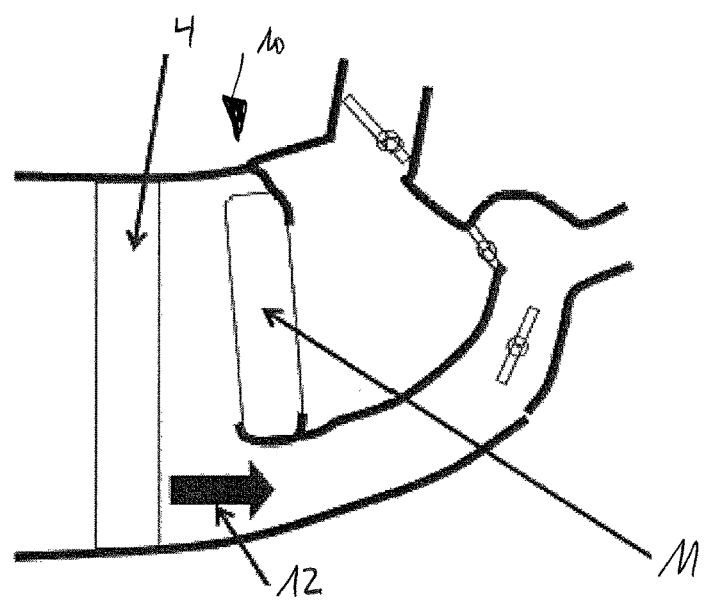

FIG. 2 shows a heat exchanger 4 installed in an air-conditioning unit 10 of the motor vehicle 1. In addition to the heat exchanger 4 for cooling for example a vehicle interior, a heating system heat exchanger 11 is also provided, by means of which the air flow 12 flowing in the direction of for example the vehicle interior can be heated.

The invention claimed is:

1. A motor vehicle, comprising:
   an internal combustion engine;
   an air-conditioning system, the air-conditioning system including a heat exchanger and a compression refrigeration machine, the heat exchanger and the compression refrigeration machine incorporated in a coolant circuit, the coolant circuit configured to communicate a coolant flow and including a pump, wherein the compression refrigeration machine contains a refrigerant circuit configured to circulate a refrigerant separately from the coolant flow of the coolant circuit, the compression refrigeration machine including a compressor arranged in the refrigerant circuit and mechanically driven at least one of directly and indirectly via the internal combustion engine;
   an adsorption system incorporated in the coolant circuit and connected to the internal combustion engine in a heat-transferring manner, the adsorption system configured to receive a waste heat load from the internal combustion engine for operation; and
   a valve device incorporated into the coolant circuit and switchable between at least two positions for distributing the coolant flow between the adsorption system and the compression refrigeration machine, wherein in one position the valve device directs the coolant flow exclusively via the adsorption system and blocks the coolant flow through the compression refrigeration machine to shut off the compression refrigeration machine;
   wherein the valve device is arranged in the coolant circuit downstream of the pump with respect to the coolant flow, the pump is arranged between the heat exchanger and the valve device, and wherein the compression refrigeration machine and the adsorption system are arranged in the coolant circuit downstream of the valve device with respect to the coolant flow; and
   wherein the pump is in use when at least one of the adsorption system is in use and when the compression refrigeration machine is in use.

2. The motor vehicle according to claim 1, wherein the heat exchanger is a coolant-air heat exchanger arranged in the coolant circuit and configured to transfer heat between the coolant flow and air.

3. The motor vehicle according to claim 1, wherein the air-conditioning system is configured for air-conditioning at least one of a structural component and a vehicle interior.

4. The motor vehicle according to claim 1, wherein the coolant flow includes a glycol-water mixture.

5. The motor vehicle according to claim 1, wherein in another position of the at least two positions the valve device is arranged to direct the coolant flow exclusively to the compression refrigeration machine and block the coolant flow through the adsorption system.

6. The motor vehicle according to claim 1, wherein the valve device distributes the coolant flow between the adsorption system and the compression refrigeration machine in an intermediate position between the at least two positions.

7. A method for air-conditioning a motor vehicle, comprising:
   circulating, via a pump, a coolant flow in a coolant circuit;
   cooling at least one of a vehicle interior and a component via a heat exchanger incorporated in the coolant circuit circulating;
   cooling a coolant of the coolant flow via at least one of (i) a compression refrigeration machine containing a refrigerant circuit separate from the cooling circuit and driven by an internal combustion engine and (ii) an adsorption system connected in a heat-transferring manner to the internal combustion engine;
   wherein cooling the coolant of the coolant flow includes distributing the coolant flow between the compression refrigeration machine and the adsorption system via a valve device;
   wherein cooling the at least one of the vehicle interior and the vehicle component includes conducting the coolant flow through the heat exchanger in a heat-transferring manner after cooling the coolant;
   wherein the valve device is arranged in the coolant circuit downstream of the pump with respect to the coolant flow, the pump is arranged between the heat exchanger and the valve device, and wherein the compression refrigeration machine and the adsorption system are arranged in the coolant circuit downstream of the valve device with respect to the coolant flow; and
   wherein the pump is in use when at least one of the adsorption system is in use and when the compression refrigeration machine is in use.

8. The method according to claim 7, wherein distributing the coolant flow between the adsorption system and the compression refrigeration machine via the valve device includes directing the coolant flow exclusively to the adsorption system for cooling the coolant and blocking the coolant flow through the compression refrigeration machine by arranging the valve device in a first position.

9. The method according to claim 8, wherein distributing the coolant flow between the adsorption system and the compression refrigeration machine via the valve device further includes directing the coolant flow exclusively to the compression refrigeration machine for cooling the coolant and blocking the coolant flow through the adsorption system by arranging the valve device in a second position.

10. The method according to claim 9, wherein the valve device is arranged in the first position when the internal combustion engine has a first predefined temperature, and the valve device is arranged in the second position when the internal combustion engine has a second predefined temperature higher than the first predefined temperature.

11. The method according to claim 7, wherein distributing the coolant flow between the compression refrigeration machine and the adsorption system includes directing a portion of the coolant flow to the compression refrigeration machine and directing another portion of the coolant flow to the adsorption system by arranging the valve device in an intermediate position.

12. The motor vehicle according to claim 1, wherein the air-conditioning system further includes an air-conditioning unit for communicating air to a cabin interior, and wherein the heat exchanger is arranged in the air-conditioning unit.

13. A motor vehicle, comprising:
an internal combustion engine;
a coolant circuit configured to communicate a coolant flow;
a pump arranged in the coolant circuit;
an air conditioning system incorporated into the coolant circuit, the air conditioning system including a heat exchanger for cooling a vehicle component and a compression refrigeration machine configured to transfer heat from the coolant flow, wherein the compression refrigeration machine is operatively coupled to the internal combustion engine, the compression refrigeration machine containing a refrigerant circuit for a refrigerant flow separate from the coolant flow of the coolant circuit and including a compressor integrated into the refrigerant circuit, wherein the compressor is driven at least one of directly and indirectly via the internal combustion engine;
an adsorption system incorporated into the coolant circuit configured to transfer heat from the coolant flow, the adsorption system thermally coupled to the internal combustion engine and configured to receive a waste heat load from the internal combustion engine for operation; and
a valve device incorporated into the coolant circuit configured to distribute the coolant flow between the adsorption system and the compression refrigeration machine, the valve device switchable between a first position where the valve device is arranged to direct the coolant flow exclusively to the adsorption system for cooling the coolant flow and to block the coolant flow through the compression refrigeration machine, and a second position where the valve device is arranged to direct the coolant flow exclusively to the compression refrigeration machine for cooling the coolant flow and to block the coolant flow through the adsorption system;
wherein the valve device is arranged in the coolant circuit downstream of the pump with respect to the coolant flow, the pump is arranged between the heat exchanger and the valve device, and wherein the compression refrigeration machine and the adsorption system are arranged in the coolant circuit downstream of the valve device with respect to the coolant flow; and
wherein the pump is in use when at least one of the adsorption system is in use and when the compression refrigeration machine is in use.

14. The motor vehicle according to claim 13, wherein the heat exchanger is a coolant-air heat exchanger arranged in the coolant circuit and configured to transfer heat between the coolant flow and air.

15. The motor vehicle according to claim 13, wherein the vehicle component includes at least one of a cabin interior and an electrical energy store.

16. The motor vehicle according to claim 13, wherein the valve device is further switchable to an intermediate position to distribute a portion of the coolant flow to the adsorption system and another portion of the coolant flow to the compression refrigeration machine.

17. The motor vehicle according to claim 13, wherein the air-conditioning system further includes an air-conditioning unit for communicating air to a cabin interior, and wherein the heat exchanger is arranged in the air-conditioning unit.

18. The motor vehicle according to claim 1, wherein the direct mechanical driving of the compression refrigeration machine by the internal combustion engine is via a corresponding mechanical connecting member.

19. The motor vehicle according to claim 1, wherein the indirect mechanical driving of the compression refrigeration machine by the internal combustion engine is via an electric motor, which is supplied with electrical energy by an alternator, said alternator being driven by the internal combustion engine.

* * * * *